United States Patent [19]

Ando et al.

[11] Patent Number: 4,483,809
[45] Date of Patent: Nov. 20, 1984

[54] PROCESS FOR PREPARING POLYOLEFIN FOAM

[75] Inventors: Masao Ando, Toyonaka; Kenkichi Tanaka; Kiroku Sato, both of Settsu, all of Japan

[73] Assignee: Kanegafuchi Kagaku Kogyo Kabushiki Kaisha, Osaka, Japan

[21] Appl. No.: 458,134

[22] Filed: Jan. 14, 1983

[30] Foreign Application Priority Data

Jan. 14, 1982 [JP] Japan ............................ 57-4514

[51] Int. Cl.$^3$ .............................................. B29D 27/00
[52] U.S. Cl. .............................. 264/53; 264/DIG. 5; 264/DIG. 15; 264/DIG. 18
[58] Field of Search .................. 264/53, 51, DIG. 15, 264/DIG. 5, DIG. 18

[56] References Cited

U.S. PATENT DOCUMENTS

| | | | |
|---|---|---|---|
| 2,744,291 | 5/1956 | Stastny et al. | 264/DIG. 15 |
| 2,787,809 | 4/1957 | Stastny | 264/DIG. 15 |
| 2,816,827 | 12/1957 | Roth | 264/DIG. 15 |
| 3,504,068 | 3/1970 | Zizlsperger et al. | 264/53 X |
| 3,725,320 | 4/1973 | Wang | 264/53 X |
| 3,804,378 | 4/1974 | Walls et al. | 264/53 X |
| 3,856,719 | 12/1974 | Miyamoto et al. | 264/53 X |
| 3,953,558 | 4/1976 | Hatano et al. | 264/DIG. 5 |
| 4,150,077 | 4/1979 | Slocumb | 264/53 |
| 4,368,276 | 1/1983 | Park | 264/53 X |
| 4,399,087 | 8/1983 | Akiyama et al. | 264/53 |

FOREIGN PATENT DOCUMENTS

| | | |
|---|---|---|
| 49-128065 | 12/1974 | Japan . |
| 51-88566 | 8/1976 | Japan . |
| 52-22951 | 6/1977 | Japan . |
| 53-33996 | 9/1978 | Japan . |
| 55-7816 | 2/1980 | Japan . |

*Primary Examiner*—Philip Anderson
*Attorney, Agent, or Firm*—Armstrong, Nikaido, Marmelstein & Kubovcik

[57] ABSTRACT

The present invention relates to a process for preparing a polyolefin foam by heat-molding pre-expanded beads of an expandable polyolefin resin containing a foaming agent in a mold, said process being improved in preparing beads having a peak expansion rate at pre-expansion equal to 1.3 to 3 times the expansion rate of beads to be packed into the mold, adjusting the beads to a pre-expansion rate depending on an expansion rate of the desired foam, and packing and molding the pre-expanded beads in a mold without any further addition of expandability thereto. The polyolefin foam prepared by the process of the present invention is evenly fused to the interior and is less liable to shrink or deform.

7 Claims, 2 Drawing Figures

PROCESS FOR PREPARING POLYOLEFIN FOAM

BACKGROUND OF THE INVENTION

The present invention relates to a process for preparing a polyolefin foam in a mold from expandable polyolefin beads. More particularly, the invention relates to a process for preparing a well-fused and less-shrinkable polyolefin foam having excellent appearance by controlling the ratio of the peak expansion rate of beads in a pre-expansion stage to the expansion rate of beads to be molded within a definite predetermined range to made the best of the expandability of pre-expanded beads.

Polyolefin beads are usually pre-expanded by incorporating a foaming agent therein and heating them in a pre-expansion tank to produce pre-expanded beads. However, polyolefin resins differ remarkably from polystyrene resins in gas permeability, viscoelasticity of melt, rigidity of resin, and the like so that if a polyolefin resin is expanded to a high bulk in a single pre-expansion, the pre-expanded foam cells are crushed in a few seconds or hours after removal from the pre-expansion tank to give only shrunken pre-expanded beads. Thus, it is very difficult to control the heat-molding conditions. Therefore, even if the beads are pre-expanded to a high bulk or expansion rate, the expansion rate of beads some time after removal from the mold is so low that if used for a post-expansion, the beads give a hard molding having only a low expansion rate.

As an attempt to overcome the above-mentioned disadvantages of the conventional processes for preparation of a polyolefin foam from beads and to provide an industrial process, Japanese Examined Patent Publication No. 22951/1977 and Japanese Unexamined Patent Publication No. 128065/1974 disclose a process wherein a pressurized inorganic gas is introduced into the pre-expanded beads under pressure to recover the loss of volume due to shrinkage and impart additional expandability thereto before submitting them to a post-expansion stage. More recently, with the progress of research in polyolefin foams, several new processes have been proposed. Those processes include a process in which various molding gases are added to the pre-expanded beads, a process in which pre-expanded beads are compressed and filled into a mold (Japanese Examined Patent Publication No. 33996/1978), a process in which a molded foam is subjected to a complicated temperature history treatment without addition of a molding gas (Japanese Examined Patent Publication No. 7816/1980), and a process in which a mixture of water vapor with a particular gas are used in molding step (Japanese Unexamined Patent Publication No. 88566/1976).

However, those prior art processes have their own drawbacks and involve many problems that must be solved and equipment-wise limitations. For example, in the process involving an additional supply of molding gas, the beads must be molded within a relatively short period of time during which more than a required amount of the foaming agent is still present in the expandable beads and it is necessary to link the step of supplying the molding gas with the molding step in a continuous arrangement. The process in which the pre-expanded beads are compressed and packed in a mold (Japanese Examined Patent Publication No. 33996/1978) is designed to impart additional expansibility to beads by subjecting them to a compression load. In such process, however, it is necessary to make a special arrangement for feeding the compressed beads into the mold and, also, to synchronize a compression device with a molding machine.

As regards the process wherein the pre-expanded beads are used as they are in the molding step without an additional supply of molding gas, it is necessary, as described in the aforementioned Japanese Examined Patent Publication No. 7816/1980, that after application molding heat, the molded foam is subjected to a temperature history such that it is first cooled to a temperature below the softening point of the resin or nomal temperature, then heated to the softening temperature of the resin or a temperature lower than the softening temperature by 40° C. and finally cooled gradually. Such a temperature history can be achieved only by complicated temperature and time control and with a complicated equipment.

The process in which a gaseous mixture of water vapor with a foaming gas are used in the heat molding of pre-expanded beads is intended to impart an expandability to the beads at the heat molding stage. The process, however, additionally requires a mixed gas generator, which complicates the molding process.

The present invention can provide a process for preparing a polyolefin foam which is evenly fused to the interior and is less liable to shrink or deform by employing expandable polyolefin beads capable of expanding to a suitable extent in the heat molding.

SUMMARY OF THE INVENTION

According to the present invention there is provided a process for preparing a polyolefin foam by heat-molding pre-expanded beads of an expandable polyolefin resin containing a foaming agent in a mold, said process being improved in preparing beads having a peak expansion rate at pre-expansion equal to 1.3 to 3 times the expansion rate of beads to be packed into the mold, adjusting the beads to a pre-expansion rate depending on an expansion rate of the desired foam, and packing and molding the pre-expanded beads in a mold without any further addition of expandability thereto. Furthermore, there is provided a process for preparing a polyolefin foam by holding the resultant molding in an atmosphere whose temperature is lower than a melting point of the polyolefin resin by 20° to 50° C.

DETAILED EXPLANATION

Figure 1:
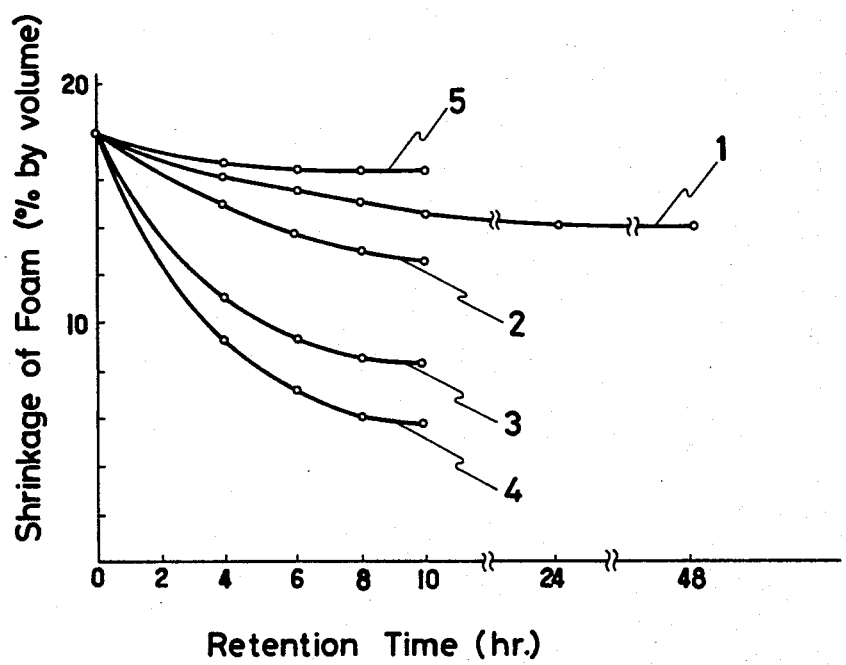
FIG. 1 is a graphic representation of the effect of aging or heat treatment at temperatures from room temperature to 90° C. applied to the foam taken out of the mold. The abscissa is for the heat treatment time and the ordinate for the percent shrinkage (by volume) of the foam after the treatment on the mold volume basis.
Figure 2:
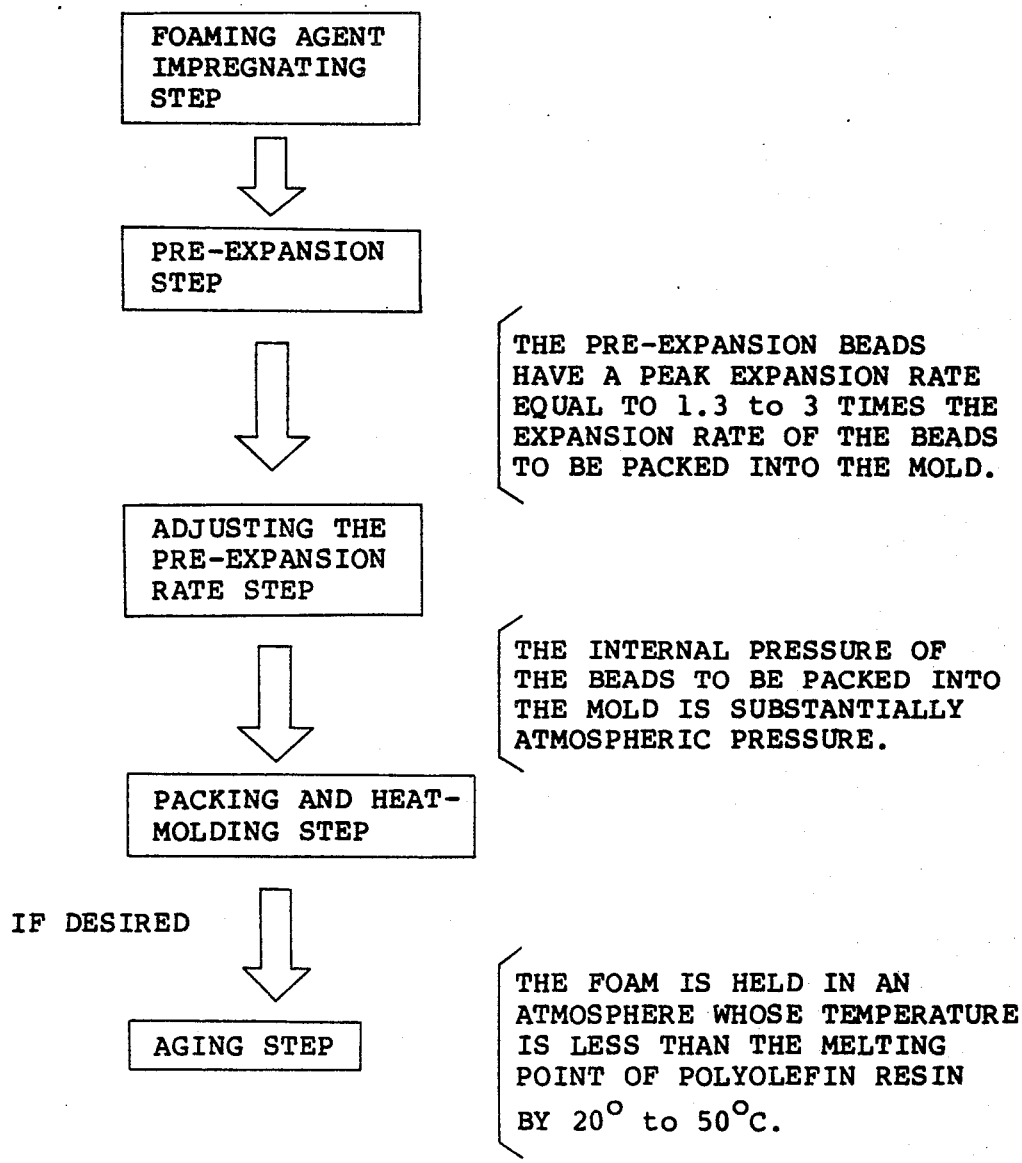
FIG. 2 is a flow diagram of the present process.

The above-mentioned polyolefin resin is preferably a cross-linked polyethylene resin or a propylene-ethylene random copolymer.

The amount of expansion of beads in the heat-molding depends on such factors as the nature and amount of the expandable gas contained in the beads and the strength of resin film constituting the beads.

Japanese Examined Patent Publication No. 22915/1976 discloses a process in which an inorganic molding gas at a pressure of not less than 1.18 atms. is additionally supplied to pre-expanded beads to impart an expandability to the beads. In contrast, the present invention is predicated on the strength of resin film, that is to say, the ease of expansion of the beads themselves. As a result of a study of the ease of expansion of beads under conditions such that their internal pressure is atmospheric pressure which does not add to their expandability, when there is no difference in closed-cell ratio, the amount of expansion at heat-molding is governed by the peak expansion rate which the beads has attained in the pre-expansion step, and when the expansion rate of beads packed into the mold is held constant, the higher the peak expansion rate of beads at pre-expansion is, the greater the amount of expansion at heat-molding is. The relation of this amount of thermal expansion with the quality of the foam is such that less expanded beads will not cause a sufficient inter-pressing of beads in the mold. Therefore, in order to obtain a foam of good fusion a large amount of thermal energy is required, which leads to shrinkage and deformation of the molded foam. To prevent such phenomenon, an additional quantity of a molding gas must be additionally introduced into beads at a pressure of supra-atmospheric pressure. Thus, it is impossible to perform the molding operation without imparting an additional expandability to the beads. On the other hand, when beads having an excess expansion are employed, the surface fusion of beads proceeds so fast that the heating medium will not penetrate into the interior of the molding to give a molded foam with a poor internal fusion.

When the peak expansion rate at pre-expansion is less than 1.3 times the expansion rate at packing into the mold, the expansion is so small that, as aforementioned, an additional supply of molding gas need be provided. On the other hand, when the peak expansion rate at pre-expansion is in excess of 3 times, the expansion will be too great and the internal fusion be poor. Moreover, when a high bulk article is desired, a very high peak expansion rate must be provided at pre-expansion, which is an economic disadvantage. Thus, by controlling the size of pre-expanded beads within the range of 1.3 to 3 times the expansion rate of beads immediately before packing into the mold, it is possible to obtain a foam having good fusion, less shrinkage feature and an attractive appearance without adding any expandability to the pre-expanded beads.

In addition to the use of the above-mentioned particular pre-expanded beads, when the resultant molding is aged in an atmosphere whose temperature is less than a melting point of the polyolefin resin by 20° to 50° C., there is obtained a foam with a smooth, creaseless surface in good yield. The temperature of the atmosphere may be any given constant temperature within the above range and it is not necessary to vary the temperature. When the temperature is less than the melting point of the polyolefin resin by more than 50° C., the softening of the resin does not proceed and the diffusion of gas through the resin film is so low that a prolonged aging operation will be necessary. On the other hand, when the temperature of the aging atmosphere is not lower than the melting point of the polyolefin resin by more than 20° C., the resin will become too soft and the molding be too deformable. The time necessary for this post-molding aging step depends on the size and configuration of the molding and is generally more than 6 hrs.

In the molding procedure with a mold, the density of the finally obtained foam is generally dependent on the density of beads packed into the mold. Therefore, in order to obtain a foam with a desired expansion rate, it is common practice to pre-adjust the density of beads to that commensurate therewith. The preparation of the beads having a peak expansion rate at pre-expansion equal to 1.3 to 3 times the expansion rate of beads to be packed into the mold and the pre-expansion of the beads to a necessary pre-expansion rate can be effected by adjusting the amount and kind of the foaming agent at pre-expansion and the amount of water vapor that penetrates into the beads at heating with the water vapor. It is also possible to effect the pre-expansion by heating the beads. In an alternative procedure, the beads are held in a pressurized inorganic gas atmosphere so as to adjust the pre-expansion rate by means of the force of gas introduced into the cells of the beads under pressure.

The pre-expanded beads may be prepared, for example, by expanding the expandable polyolefin beads containing a foaming agent under pressure in a pressure-resistant vessel, by extruding the expandable polyolefin resin to obtain expanded strands with an extruding machine and cutting them into beads, and by dispersing expandable beads containing a foaming agent into water under pressure and releasing them at atmospheric pressure. The beads pre-expanded by any of those and other methods may be employed in the present invention.

In case where the beads according to the present invention are employed, the cooling process after thermal molding and the whole molding cycle are shortened, which increase productivity.

The polyolefin resin employed in the invention includes polyolefin homopolymers such as low-density, medium-density and high-density polyethylenes, isotactic polypropylene and polybutene-1, and copolymers of ethylene or polypropylene with other copolymerizable monomers such as ethylene-propylene copolymer, ethylene-vinyl acetate copolymer, ethylene-acrylic acid copolymer, ethylene-ethyl acrylate copolymer and ethylene-vinyl chloride copolymer. These polyolefin resins may be used alone or in combination.

The term "peak expansion rate of the pre-expanded beads" as used in the specification means the maximum expansion rate of the pre-expanded beads before they begin to shrink, and is measured by allowing the pre-expanded beads to stand at room temperature and atmosphic pressure for more than 48 hrs., introducing nitrogen gas into the pre-expanded beads at a $N_2$ gas pressure of 30 kg./cm.$^2$G at a temperature less than the melting point of the polyolefin resin by 30° C. for 180 min., and then taking out the beads into an atmospheric pressure condition.

The value of expandability can be measured as the following manner. At first, the beads are put in a container and precisely weighed to find its weight (W). Then, the vessel is connected to a water column with one of its end exposed to atmospheric pressure and the volume of gas (Vg) emanating from the beads is measured. Separately, the weight and volume of beads sampled from the same population as that used for measurement of the internal pressure are measured to derive a relation formula. According to the formula, the weight (Vo) of beads for measuring internal pressure is calculated from their weight. The internal pressure (P) of the beads can be calculated from the equation:

$$P = Vg/(Vo - W/d)$$

wherein d represents the density of the polyolefin resin.

The term "expansion rate" is used herein to mean the value calculated from the weight of beads ($W_1$), the density of the polyolefin resin (d) and the volume of beads ($V_1$) by means of the following equation:

Expansion rate = $V_1/W_1/d$ wherein $V_1$ represents the volume of beads after thorough deaeration following submersion thereof into water.

EXAMPLE 1

Cross-linked low-density polyethylene beads (average particle size: 2.2 mm.) containing 25 parts by weight of dichlorodifluoromethane per 100 parts by weight of polyethylene were pre-expanded by heating in a pressure-resistant vessel under various expansion conditions to give polyethylene beads having the peak expansion rates of 26, 30, 35, 50 and 60 times, as shown in Table 1. The peak expansion rates shown in Table 1 were measured by allowing the expanded beads to stand at room temperature under atmospheric pressure for 48 hrs. The pre-expanded beads were allowed to stand at room temperature for 24 hrs. for removing moisture and then kept in an atmosphere maintained at temperatures of 60° C. under atmospheric pressure, for 150, 120, 80, 40 and 30 min., respectively, and then taken out into an atmosphere at room temperature. In this way, pre-expanded beads having an expansion rate of 20 times were obtained.

A mold (cavity size: 250×250×50 mm.), which had a small bore for a supply of steam for heating and was unhermetically closable, was filled with the beads which were adjusted in expansion rate as mentioned above and taken out at room temperature, and then was heated for 10 to 30 sec. by feeding steam at 1 to 2 kg./cm.$^2$G, whereby the beads were expanded and fused together. After cooling with water, the molded foam was taken out of the mold, allowed to stand at room temperature under atmospheric pressure for 48 hrs., and then evaluated for fusion and for shrinkage and deformation.

In evaluating with respect to fusion, the molded foam was torn apart and the fracture surface was observed. When the breakage occured within the beads themselves (not in the interface among the beads) to an extent of 60% or more, the foam was evaluated as being good in fusion (O) and, when less than 60%, as being poor in fusion (X). In evaluating with respect to shrinkage and deformation, the mold volume and the molded foam volume were compared. When the molded foam volume was not less than 85% of the mold volume, the foam was evaluated as good in shrinkage and deformation (O) and, when less than 85%, as poor in shrinkage and deformation (X).

The relationship between the rate (R) of the peak expansion rate of the beads at pre-expansion to the expansion rate of the beads charged in the mold and the results of the evaluation of the molded foam (for fusion and shrinkage and deformation) is shown in Table 1.

TABLE 1

| Peak expansion rate attained at pre-expansion | R | Period of maintenance at an atmosphere at 60° C. (min.) | Bead internal pressure before molding (atm.) | Evaluation of molded article | |
|---|---|---|---|---|---|
| | | | | Fusion | Shrinkage/deformation |
| 26 | 1.30 | 150 | 1.0 | O | O |
| 30 | 1.50 | 120 | 1.0 | O | O |

TABLE 1-continued

| Peak expansion rate attained at pre-expansion | R | Period of maintenance at an atmosphere at 60° C. (min.) | Bead internal pressure before molding (atm.) | Evaluation of molded article | |
|---|---|---|---|---|---|
| | | | | Fusion | Shrinkage/deformation |
| 35 | 1.75 | 80 | 1.0 | O | O |
| 50 | 2.50 | 40 | 1.0 | O | O |
| 60 | 3.00 | 30 | 1.0 | O | O |

COMPARATIVE EXAMPLE 1

The following beads were prepared.
(1) Beads having a peak expansion rate of 22 times (R=1.10),
(2) Beads having a peak expansion rate of 24 times (R=1.20),
(3) Beads having a peak expansion rate of 62 times (R=3.10),
(4) Beads having a peak expansion rate of 65 times (R=3.25).

The beads were kept in an atmosphere at 60° C. for 250, 180, 30 or 20 min., as shown in Table 2, and the beads so adjusted to a expansion rate of 20 times were filled in the mold and molded. The molded foam evaluated in the same manner as in Example 1. The results are shown in Table 2.

TABLE 2

| Peak expansion rate attained at pre-expansion | R | Period of maintenance at an atmosphere at 60° C. (min.) | Bead internal pressure before molding (atm.) | Evaluation of molded article | |
|---|---|---|---|---|---|
| | | | | Fusion | Shrinkage/deformation |
| 22 | 1.10 | 250 | 1.0 | O | X |
| 24 | 1.25 | 180 | 1.0 | O | X |
| 62 | 3.10 | 30 | 1.0 | X | O |
| 65 | 3.25 | 20 | 1.0 | X | O |

EXAMPLE 2

Cross-linked low-density polyethylene beads (average particle size: 2.2 mm.; melting point of the polyethylene: 105° C.) containing 25 parts by weight of dichlorodifluoromethane were expanded by heating in a pressure-resistant vessel to a peak expansion rate of 35 times. The pre-expanded beads were allowed to stand at room temperature under atmospheric pressure for 24 hrs., maintained in an atmosphere at 60° C. for 80 min. and taken out into an environment at atmospheric pressure. The resulting expanded beads which had an expansion rate of 20 times were allowed to stand at room temperature under atmospheric pressure for 24 hrs. A mold (cavity size: 250×250×50 mm.) which had a small bore and was unhermetically closable, was filled with the expanded beads. Expansion and fusion of the beads were effected by heating for 20 sec. by feeding steam at 1 kg./cm.$^2$G. After cooling with water, the molded foam was taken out of the mold and subjected to any of the following aging treatments:
(1) Allowing to stand at room temperature for 4, 6, 8, 10, 24 or hrs.,
(2) Maintaining at 50° C. for 4, 6, 8 or 10 hrs.,
(3) Maintaining at 60° C. for 4, 6, 8 or 10 hrs.,
(4) Maintaining at 80° C. for 4, 6, 8 or 10 hrs.,
(5) Maintaining at 90° C. for 4, 6, 8 or 10 hrs.

Following the above aging treatment, each sample was allowed to stand at room temperature under atmospheric pressure for 12 hrs. and then measured a ratio of shrinkage of the foam on the basis of the volume of the mold. The results are shown in FIG. 1. In FIG. 1, curve Nos. 1, 2, 3, 4 and 5 are those of the foams treated at temperatures of room temperature, 50° C., 60° C., 80° C. and 90° C., respectively. In that case, if the ratio of shrinkage in the foam obtained exceeds 10% on the basis of the volume of the mold, the so-called phenomenon of "sink mark" due to great local shrinkage becomes observable. If the shrinkage exceeds 15%, the "sink mark" becomes rather significant and in such a case difficulties may be encountered in mold designing since the degree of shrinkage of each portion of the foam depends on its shape and thickness. As is indicated in FIG. 1 by curves 3 and 4, aging at a temperature lower by 20° to 50° C. than the melting point of the polyethylene can give foams with smaller extents of shrinkage, i.e. with shrinkage degrees of less than 10%.

EXAMPLE 3

Cross-linked low-density polyethylene beads containing 20 parts by weight of dichlorodifluoromethane were charged in a pressure-resistant vessel and heated to give pre-expanded beads with a peak expansion rate of 45 times. The pre-expanded beads were kept at room temperature under atmospheric pressure for 24 hrs. and then in an atmosphere at 60° C. under a nitrogen pressure of 9 kg./cm.$^2$G for 60 min., and then taken out into an atmospheric environment, whereby expanded beads with an expansion rate of 32 times were obtained. The internal pressure of the beads was measured and found to be 1 atm. Even after allowing to stand for 30 days at room temperature under atmospheric pressure, these expanded beads could give a foam of an expansion rate of 45 times having good fusion and small extents of shrinkage and deformation.

EXAMPLE 4

Cross-linked low-density polyethylene beads ehich were pre-expanded to a peak expansion rate of 40 times were maintained in an atmosphere at 60° C. for 60 min., and then taken out into an environment at room temperature. The thus-obtained expanded beads having an an expansion rate of 20 times were charged in a mold, 250×250×50 mm. in size, which had a small bore and was unhermetically closable, heated for 20 sec. by feeding steam at 1 kg./cm.$^2$G, and then cooled with water at 20° C. The foam was taken out of the mold after cooling for various period. The shortest cooling period which did not lead to breakage or cracking due to post-expansion following discharge of the foam from the mold as found was 40 sec.

COMPARATIVE EXAMPLE 2

Cross-linked low-dinsity polyethylene beads which were pre-expanded at a peak expansion rate of 24 times were allowed to stand at room temperature under atmospheric pressure for 24 hrs., maintained in an atmosphere at 60° C. under a nitrogen gas pressure of 9 kg./cm.$^2$G for 150 min., and taken out into an environment at room temperature. The thus-obtained expanded beads having an expansion rate of 20 times were placed in a mold, 250×250×50 mm. in size, which had a small bore and was unhermetically closable, and heated for 20 sec. by feedling steam at 1 kg./cm.$^2$G and then cooled with water at 20° C. The foam was taken out of the mold after cooling for various period. The shortest cooling period which did not lead to breakage or cracking due to postexpansion following discharge of the foam from the mold as found was 80 sec.

EXAMPLE 5

Propylene-ethylene random copolymer (commercial name "Sumitomo Noblene" commercially available from Sumitomo Kagaku Kogyo Kabushiki Kaisha; density 0.90, MI=9) was immersed with n-butane as the foaming agent and heated with steam at 1 kg./cm.$^2$G for 40 sec. to give expanded beads having an expansion rate of 15 times. The expanded beads were immersed with nitrogen gas by maintaining them in an atmosphere at a temperature of 80° C. under a nitrogen gas pressure of 25 kg./cm.$^2$G, and then expanded by heating for 60 sec. with steam at 2.5 kg./cm.$^2$G, whereby expanded beads having an expansion rate of 30 times were obtained. The peak expansion rate of these expanded beads at preexpansion was 40 times, which was 1.33 times the expansion rate of the beads prior to charge in the mold. The beads were allowed to stand at room temperature under atmospheric pressure for 24 hrs. A mold, 250×250×50 mm. in size, which had a small bore and was unhermetically closable, was filled with the beads, followed by heating for 40 sec. by feeding steam at 2.5 kg./cm.$^2$G. After cooling, the foam was taken out of the mold. The foam had an expansion rate of 45 times and was satisfactory in fusion and substantially free from shrinkage and deformation.

COMPARATIVE EXAMPLE 3

The procedure of Example 5 was repeated except that the heating for expansion with steam at 2.5 kg./cm.$^2$G was conducted for 40 sec. in stead of 60 sec. the peak expansion rate of the thus obtained preexpanded beads was 33 times (1.1 times the expansion rate of the beads to be charged in the mold). The foam molded from the beads was inferior in appearance and had a great extent of shrinkage and deformation.

What is claimed is:

1. In a process for preparing a polyolefin foam by impregnating polyolefin resin particles with a foaming agent, pre-expanding the polyolefin resin particles to give pre-expanded beads, adjusting the beads to a pre-expansion rate depending on an expansion rate of the desired foam, packing and heat-molding the pre-expanded beads in a mold, the improvement which comprises preparing pre-expanded beads having a peak expansion rate at the pre-expansion step equal to 1.3 to 3 times the expansion rate of the beads to be packed into the mold, and adjusting at the adjusting step an internal pressure of the beads to be packed into the mold to substantially atmospheric pressure.

2. The process of claim 1, wherein said polyolefin resin is a cross-linked polyethylene.

3. The process of claim 1, wherein said polyolefin resin is a propylene-ethylene random copolymer.

4. In a process for preparing polyolefin foam by impregnating polyolefin resin particles with a foaming agent, pre-expanding the polyolefin resin particles to give pre-expanded beads, adjusting the beads to a pre-expansion rate depending on an expansion rate of the desired foam, packing and heat-molding the pre-expanded beads in a mold, the improvement which comprises preparing pre-expanded beads having a peak expansion rate at the pre-expansion step equal to 1.3 to 3 times the expansion rate of the beads to be packed into the mold, adjusting at the adjusting step an internal pressure of the beads to be packed into the mold to substantially atmospheric pressure, and holding the resultant molding in an atmosphere whose temperature is less than the melting point of the polyolefin resin by 20° to 50° C.

5. The process of claim 4, wherein said polyolefin resin is a cross-linked polyethylene.

6. The process of claim 5, wherein said cross-linked polyethylene is a low-density polyethylene having a density of 0.91 to 0.93.

7. The process of claim 4, wherein said polyolefin resin is a propylene-ethylene random copolymer.

* * * * *